United States Patent [19]

Hanai et al.

[11] Patent Number: 5,035,465
[45] Date of Patent: Jul. 30, 1991

[54] VEHICULAR INFANT SAFETY SEAT WITH SEAT BACK SAFETY STOPPER

[75] Inventors: Toshimichi Hanai, Yokosuka; Hideyuki Nagashima, Yokohama; Yasuyuki Fujita, Akishima, all of Japan

[73] Assignees: Nissan Motor Co., Ltd., Yokohama; Tachi-S Co., Ltd., Tokyo, both of Japan

[21] Appl. No.: 391,771

[22] Filed: Aug. 10, 1989

[30] Foreign Application Priority Data

Aug. 25, 1988 [JP] Japan ............................ 63-110591[U]

[51] Int. Cl.⁵ .............................................. B60N 1/12
[52] U.S. Cl. .................................... 297/238; 297/216; 297/250
[58] Field of Search ................. 297/238, 250, 94, 103, 297/191, 216

[56] References Cited

U.S. PATENT DOCUMENTS

| | | | |
|---|---|---|---|
| 3,063,751 | 11/1962 | Hatch | 297/410 |
| 3,311,413 | 2/1967 | Martens | 297/410 |
| 3,542,429 | 11/1970 | Inoue et al. | 297/410 |
| 3,544,162 | 12/1970 | Uchiyamada et al. | 297/410 |
| 4,368,916 | 1/1983 | Blasin | 297/383 X |
| 4,541,654 | 9/1985 | Jonasson | 297/238 X |
| 4,655,503 | 4/1987 | Kamijo et al. | 297/238 |

FOREIGN PATENT DOCUMENTS

131336  7/1985  Japan .................................. 297/238

*Primary Examiner*—Peter R. Brown
*Attorney, Agent, or Firm*—Foley & Lardner

[57] ABSTRACT

An infant safety seat is provided on the rear side of an automobile seat back which is pivotable about a base hinge mechanism, between a position in which it leans to the rear so as to accommodate an adult passenger on the regular seat cushion, and a positon in which it leans forward so as to allow a removable infant safety seat cushion to be attached to the seat back. A seat back stopper is formed on the front edge of the removable infant safety seat. The seat back stopper projects between the bottom of the seat back frame and the relatively stationary seat cushion frame. With this arrangement if forces acting on the seat back in the rearward direction cause the dog clutch of a reclining mechanism of the seat back to fail, the seat back is prevented from rotating backwards and crushing the infant by means of the seat back stopper. Thus, it becomes unnecessary to provide a specially reinforced reclining mechanism on seats on which a rear mounted infant seat are to be mounted.

15 Claims, 5 Drawing Sheets

FIG. 5

VEHICULAR INFANT SAFETY SEAT WITH SEAT BACK SAFETY STOPPER

BACKGROUND OF THE INVENTION

1. Field of the Invention

The present invention relates generally to an infant safety seat. More specifically, the present invention relates to an infant safety seat which is appropriate for use in an automotive vehicle. Still more specifically the present invention relates to an infant safety seat of the variety which is supported on the back of a seat which is pivotable between a rearwardly tilted position defining an adult mode and a forwardly tilted position defining an infant mode.

2. Description of the Prior Art

As is well known in the art of vehicular seats safety belts have been shown to reduce the hazard to the vehicular occupant in the event of accidents. Safety belts improve the safety of the occupant by preventing the occupant from being thrown from the vehicle in a crash and by preventing the occupant from being thrown against the interior walls of the vehicular cabin. Since adult safety belts are not effective for restraining infants in the same manner as adults due to the differences in both the size and the shape of the infant's body, it has been found that, in order to afford an infant the same protection which seat belts give to an adult, it is necessary to provide an infant safety seat which can be mounted on the seat of the vehicle and held securely in place.

In view of the enhanced safety requirements, vehicle seats have been developed recently which can, when the seat back is tilted forward, accommodate an infant safety seat on the back thereof in such a manner that the child's seat faces in the rear direction. An example of such a prior art seat is shown in JM-A-62-37536.

In the device mentioned above the main seat cushion is supported on a the vehicular floor by means of a rail in such a manner as to be slidable forwardly and backwardly. A seat back reclining device is provided by which the seat back is attached to the internal frame of the seat cushion. The seat back reclining device allows the angle of the seat back to be selected from among a number of predetermined angles. The reclining device is connected to the frame of the seat cushion by means of a pivotable base link which cooperates with the seat cushion frame and the seat back to allow free pivotal movement of the seat back between a position in which it leans rearwardly and a position in which it is tilted forward so as to accommodate an infant seat to be mounted on the rear side thereof.

When the seat back is in either the rearwardly tilted position or the forwardly tilted position, the link plate can be locked by means of the latching mechanisms.

When the seat back is in the forwardly tilted position the forward latch mechanism serves to maintain the seat back in a condition wherein force acting on the link cannot cause it to fall backwardly. Therefore, the infant safety seat, which comprises a safety harness for restraining the child within the seat so as to prevent an impact to the child in the event of an accident, can be safely supported on the back of the seat. When the seat back is in the rearwardly inclined or "reclining" position, the latch mechanism serves to prevent force exerted on the seat back in the forward direction from causing the seat back to fall forward.

A release mechanism provided at the upper portion of the side edge of the seat serves to release the latching hooks from the stopper pins so that the position of the seat back can be selected from among the forward position and the reclining position.

In the above described type of seat hinge mechanism, the latching mechanism of the base link is of the conventional type which is inherently very strong. Therefore, when strong force is applied to the seat back while it is in the forwardly tilted position the force is applied to the reclining mechanism which connects the seat back to the base link. In view of the safety aspect of the infant seat it is therefore imperative to provide a reclining mechanism which is much more strongly reinforced than those found in conventional types of seat back which do not accommodate the child safety seat.

This reinforced reclining mechanism is problematic in that it is heavier and more expensive to produce than other conventional seat back reclining mechanisms. Therefore, in view of cost and weight factors, it is preferable not to provide such a reinforced seat back reclining mechanism in all vehicle seats, and accordingly, a second production line must be established for the reclining mechanisms of vehicles in which it is anticipated that the infant safety seat will be installed.

In view of the above problems there is a need that is felt in the prior art to provide a method of reinforcing conventional seat backs in such a manner that a single inexpensive production line of seat back reclining mechanisms can be safely employed, both in seats that are intended to accommodate the infant seat and in those which are not.

SUMMARY OF THE INVENTION

In view of the above problems encountered in the infant safety seats according to the prior art, it is an object of the present invention to provide a strong, inexpensive means for reinforcing a seat back reclining mechanism so as to render it appropriate for use in both conventional seat backs and those on which it is intended to provide the infant safety seat of the type which is supported by the seat back.

It is a further object of the invention to provide a seat back reclining mechanism whose strength and safety are superior to the prior art devices.

In brief, the above objects are achieved by an arrangement wherein an infant safety seat is provided on the rear side of an automobile seat back wherein the seat back is pivotable about a base hinge mechanism, between a position in which it leans to the rear so as to accommodate an adult passenger on the regular seat cushion, and a position in which it leans forward so as to allow a removable infant safety seat cushion to be attached to the seat back. A seat back stopper is formed on the front edge of the removable infant safety seat. The seat back stopper projects between the bottom of the seat back frame and the relatively stationary seat cushion frame. With this arrangement, if forces acting on the seat back in the rearward direction cause the dog clutch of a reclining mechanism of the seat back to fail, the seat back is prevented from rotating backwards and crushing the infant by means of the seat back stopper. Thus, it becomes unnecessary to provide a specially reinforced reclining mechanism on seats on which a rear mounted infant seat are to be mounted.

More specifically, a first aspect of the present invention is deemed to take the form of a child safety seat arrangement which is provided on a vehilular seat and which features: a seat cushion; a seat back support mechanism, which is movable relative to the seat cushion between a first position and a second position; a seat back, which is movably supported by the seat back support mechanism so as to be movable between a first position and a second position; an infant back support means defined on the back side of said seat back for supporting the back of an infant seated in the infant safety seat; an infant seat cushion means, detachably provided at the back side of the seat back for supporting the buttocks of the infant; an infant restraining means operable for restraining the body of the infant within said infant safety seat; a seat back stopper means provided on the infant seat cushion at a position between the seat cushion and the seat back for restricting rotation of the seat back relative to the seat cushion while the infant seat cushion is disposed on the seat back.

According to another aspect of the invention, an infant safety seat arrangement for a vehicular seat comprises: a seat back reclining means operable for defining the reclining angle of a vehicular seat back; a vehicular seat back pivotally mounted so as to pivot relative to a first vehicular seat cushion about an axis defined by the reclining means; a first vehicular seat cushion; a second vehicular seat cushion detachably disposed on the back of the seat back for defining an infant seat cushion; and a seat back stopper means formed integrally with said second vehicular seat cushion for being disposed between a lower edge of the vehicular seat back and a rear frame portion of the vehicular seat cushion for blocking rotation of the seat back relative to the first seat cushion in the rearward direction while the infant seat cushion is disposed on the seat back.

According to still another aspect of the present invention, a vehicular seat features a seat back which is pivotable about an axis defined by pivotable base link journal, between a first position and a second position defined with respect to a main seat cushion, a seat back base link locking mechanism for locking the seat back base link in a forward position, and a seat back reclining mechanism for defining a pivoting axis at an upper portion of the seat back base link, about which the seat back may be rotated relative to the seat back base link, the seat back reclining mechanism having an incremental stopper means for defining angular positions with respect to the seat back base link, at which the seat back is rigidly maintained on the seat back base link for defining the reclining angle of the seat back, and a seat back stopper means comprising: an infant seat cushion mounting member defined on a rigid frame member of said seat back; an infant seat cushion; an infant seat cushion stay received on said rigid seat cushion mounting member for rigidly maintaining the infant seat cushion on the seat back; a rigid main seat cushion frame member defined at a rear portion of the main seat cushion; and a seat back stopper rigidly formed on said infant seat cushion stay so as to projected toward said rigid main seat cushion frame member, the seat back back stopper coming into rigid contact with the rigid main seat cushion frame member for arresting rearward rotational movement of the seat back when rearward rotational forces acting on the seat back overcome said incremental stopper means of the seat back reclining mechanism causing rearward rotational movement of the seat back.

DETAILED DESCRIPTION OF THE PREFERRED EMBODIMENTS

In order to provide a clearer understanding of the principles of the present invention and in order to clarify the difference between the infant safety seat manufactured according to the principles of the present invention with those of the prior art, a detailed description shall hereinafter be given of an infant safety seat according to the instant invention using a brief disclosure of a prior art infant safety seat as a point of departure.

Figure 1:
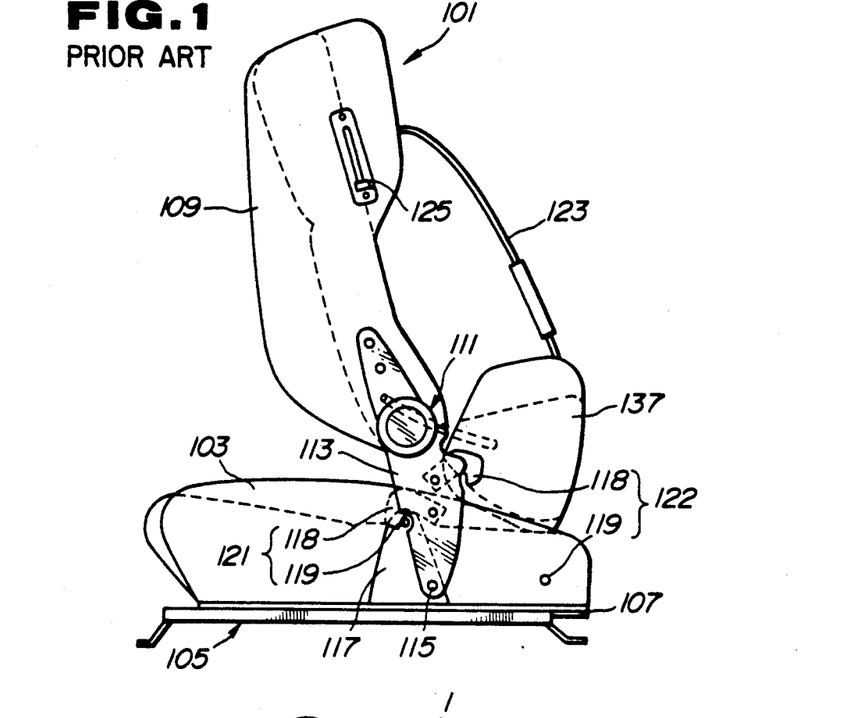
FIG. 1 is a side elevational view of a vehicular seat according to the prior art whereon an infant seat is provided at the rear side thereof.

In FIG. 1 a vehicular seat is shown on which an infant safety seat according to the prior art is disposed. In this device a seat cushion 103 is slidably supported on a support structure 105 by means of an upper rail 107 in such a manner as to be slidable forwardly and backwardly so as to be adjusted to the position which best suits the occupant of the seat. The seat back 101 comprises an inner frame which is connected to a seat back reclining device 111 at the end thereof. The seat back reclining device 111 is provided for allowing the angle of the seat back to be adjusted to the angle which the seat occupant prefers.

The reclining device 111 is connected to a frame 117 of the seat cushion 103 by means of a base link 113 which cooperates with the frame 117 which extends upwardly along the lateral side of the seat cushion 103 and toward the seat back 109. This arrangement allows free pivotal movement of the seat back 109 between a position in which it leans rearwardly and a position in which it is tilted forward. It also accommodates the mounting of an infant seat cushion 137 on the rear side thereof and/or in the case of a two door automobile, to allow the occupant of the rear seat to get in or out of the vehicle.

When the seat back 109 carried on the link plate 113 is in the rearwardly tilted position or it is in the forwardly tilted position, the link plate 113 can be locked by means of one of either the rear latching mechanism 122 or the front latching mechanism 121.

When the seat back is in the rearwardly inclined or "reclining" position, the latch mechanism 122 which is comprised of the hook 118 and the pin 119, serves to prevent force exerted on the seat back 109 in the forward direction, from causing the link plate 113 which carries the seat back 109, from moving forward.

When the seat back 109 is in the forwardly tilted position the engagement between the front latching hook 118 of the front latch mechanism 121, and the front latching pin of the front latching mechanism 121, serves to maintain the base link 113 in a condition wherein force acting on the link 113 cannot cause it to fall backwardly.

The release mechanism 125 provided at the upper portion of the side edge of the seat serves to release the hooks 118 from the pins 119 so that the position of the seat back can be selected from among the forward position and the reclining positions.

In the prior art device shown in FIG. 1 the front latch mechanism 121, if constructed in accordance with the general standard, is robust enough to prevent the seat pivot plate 113 from falling rearwardly, even under the rearward stresses thereon which would occur in a rear end type accident wherein the vehicle in which the safety seat is provided is struck from the rear. Therefore the rearward stresses, which are imposed on the seat back 109 by the mass of an infants body acting on the the safety harness 123, trying to cause the seat back 101 to collapse to the rear, are concentrated in the reclining mechanism 111.

Since it is imperative to the infant's safety that the reclining mechanism does not collapse and allow the seat back to fall backwardly, it is necessary in the prior art seat, whereon an infant seat is to be accommodated, to provide a specially reinforced reclining mechanism 111 which is heavier and stronger than the type which would otherwise conventionally be provided on a seat not intended to accommodate the rear mounted infant seat. This reinforced reclining mechanism is heavier than the normal type and is more expensive to produce.

In an infant safety seat assembly manufactured in accordance with the principles of the instant invention, a stopper mechanism is provided for retaining the seat in the forwardly tilted position even when forces acting on the seat in the rearward direction exceed those which can be withstood by the restriction means of the seat back reclining mechanism, thus allowing a conventional seat back reclining mechanism to be employed on a seat back on which a rear mounted infant safety seat is to be supported.

Figure 2:
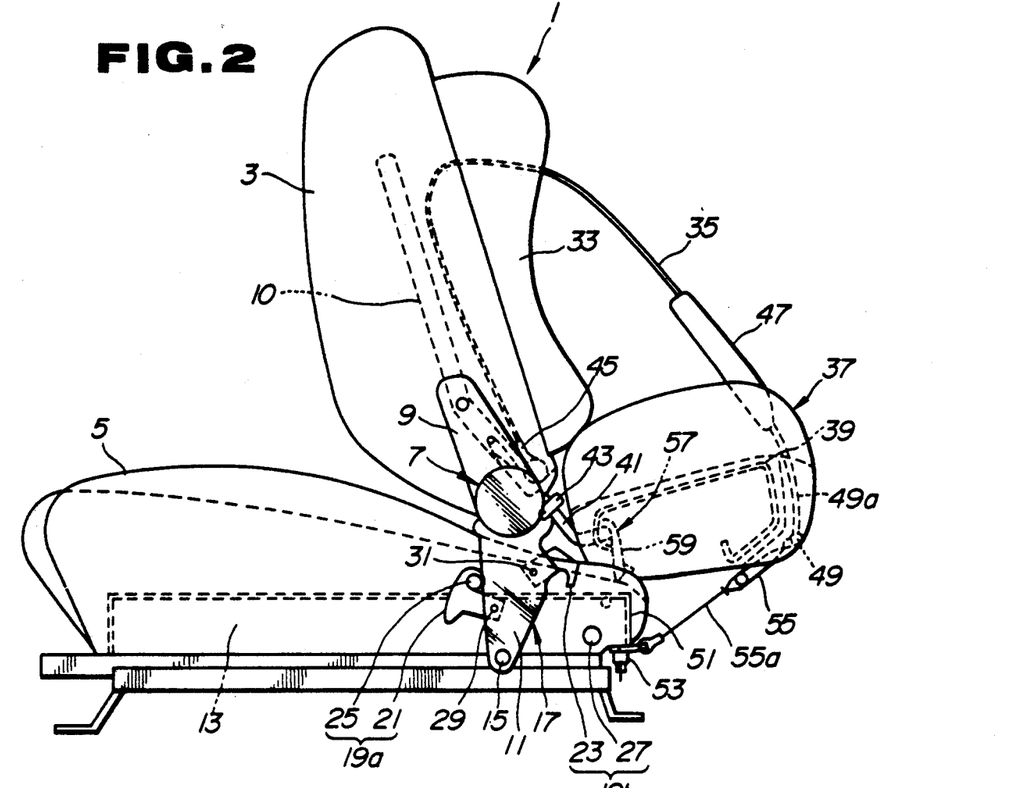
FIG. 2 is a side elevation view of a vehicular seat on which an infant seat, constructed in accordance with the principles of the present invention, is disposed.

Referring now to FIG. 2, the details of an infant safety seat assembly according to a first embodiment of the present invention shall be set forth.

FIG. 2 is a side elevational view showing an automobile seat 1 according to the invention, in a state in which an infant safety seat is supported on the rear side of the seat back 3, of the seat 1.

The automobile seat 1 according to the invention comprises the seat back 3 and the seat cushion 5. By means of a reclining angle adjuster mechanism 7, the angle of the seat back can be selected and the desired orientation obtained.

The reclining angle adjuster 7 is provided on the upper end of a base connector link plate 11. The base connector link plate 11 is pivotably connected at its lower and to the frame 13 of the seat cushion 5 by means of a journal pin 15. The journal pin 15 serves to establish a pivoting axis about which the set back connector link plate 11 may freely pivot relative to the frame 13 of the seat cushion 5. These elements in cooperation define a seat pivot mechanism 17 by which pivotal movement of the seat can be established.

Through the pivoting action of the base connector plate 11 in relation to the internal frame 13 of the seat cushion 5, about the axis defined by the journal pin 15, the seat back 3 can be moved from the rearwardly tilted position, wherein the vehicular seat 1 is in a mode appropriate to comfortably accommodate an adult or large child, to the forward tilted position indicated in the solid lines of FIG. 1 wherein the vehicular seat is in an "infant" mode suitable for accommodating an infant safety seat provided at the rear side thereof.

As the seat back 3 is moved forward, the above mentioned elements forming the seat pivoting mechanism 17 cooperate so as to pivotally support the seat back as it is moved into the infant mode position for accommodating the infant safety seat. Once the seat back is in this position the forward seat latching mechanism 19a serves to lock the seat back in the forwardly tilted infant mode position.

The forward seat latching mechanism 19a comprises a hook 21 which is pivotally connected to the side of the base connector link plate 11 by means of a journal pin 29 which serves to define a pivoting axis about which the hook 21 may pivot relative to the base link plate 11. The forward seat latching mechanism 19a also comprises a rigid stopper pin 25 which is formed so as protrude from the side of the seat cushion frame 13. When the seat back 3 is tilted into the position defining the infant mode as set forth above, the latching hook 21 becomes engaged with the stopper pin 25 so as to lock the base connector link plate 11 in its forwardmost position.

The rearward seat latching mechanism 19b comprises a hook 23 which is pivotally connected to the side of the base connector link plate 11 by means of a journal pin 31 which serves to define a pivoting axis about which the hook 23 may pivot relative to the base link plate 11. The rearward seat latching mechanism 19b also comprises a rigid pin 27 which is formed so as protrude from the side of the seat cushion frame 13. When the seat back 3 is tilted into the position defining the adult mode as set forth above, the latching hook 23 becomes engaged with the stopper pin 27 so as to lock the base connector link plate 11 in its rearwardmost position.

Thus, the base connector link plate is firmly maintained in the selected operating mode by means of the seat pivot locking mechanisms 19a and 19b.

As mentioned above, the front latching hook 21 is pivotally mounted at the front edge of the base plate 11 at the approximate vertical center thereof and is supported so as to be freely pivotable about the journal pin 29. A return spring (not shown) is provided for biasing the the front latching hook in the engaging direction (clockwise in the figures) so as to keep it in locking engagement with the stopper pin 25.

Similarly, as mentioned above, the rear latching hook 23 is pivotally mounted at the rear edge of the base plate 11 at the approximate vertical center thereof and is supported so as to be freely pivotable about the journal pin 31. A second return spring (not shown) is provided for biasing the the rear latching hook in the engaging direction (clockwise in the figures) so as to keep it in locking engagement with the stopper pin 27.

The latching hooks 21 and 23 are connected to a release mechanism or disengaging mechanism (not shown) which is operable to rotate the hooks in the counterclockwise direction so as to release them from the locking engagement with the stopper pins 25 and 27.

The reclining mechanism 7 of the seat 1 comprises an annular locking mechanism by which the angular relationship between the seat back connector plate 7 and the base connector link 11 is maintained. By the disengagement of a pawl or dog member (not shown) with the teeth (not shown) of the annular gear member (not shown) of the reclining mechanism 7, the locking engagement between the plate 9 and the base link plate 11 can be released and relative rotational movement between the seat back 3 and the base connector link 11 about a pivoting axis defined by the reclining mechanism 7 rendered possible. In this manner the reclining angle of the seat back may be selected.

When the engagement of the pawl (not shown) with the teeth of the annular gear (not shown) of the reclining mechanism 7 is re-established, the angle of the seat 3 relative to the base connector link 11 once again becomes fixed. Thus the seat back becomes locked at the selected reclining angle.

It will be noted that the above method of adjusting the reclining angle of the seat may be employed in both the mode where the seat is acting as an infant seat and in the mode wherein it is suited to accommodate an adult.

Hereinafter the construction and operation of the structure for supporting the body of an infant at the back side of the seat 3, which includes the shoulder members 33, so as to define the side restraints of the infant safety seat and the infant restraining harness 35, shall be described in detail.

At the lower side of the seat back 3 immediately beneath the infant restraining shoulder flanges 33, the infant seat cushion 37 which is designed to support the infant is detachably supported on the seat 3.

Figure 3:
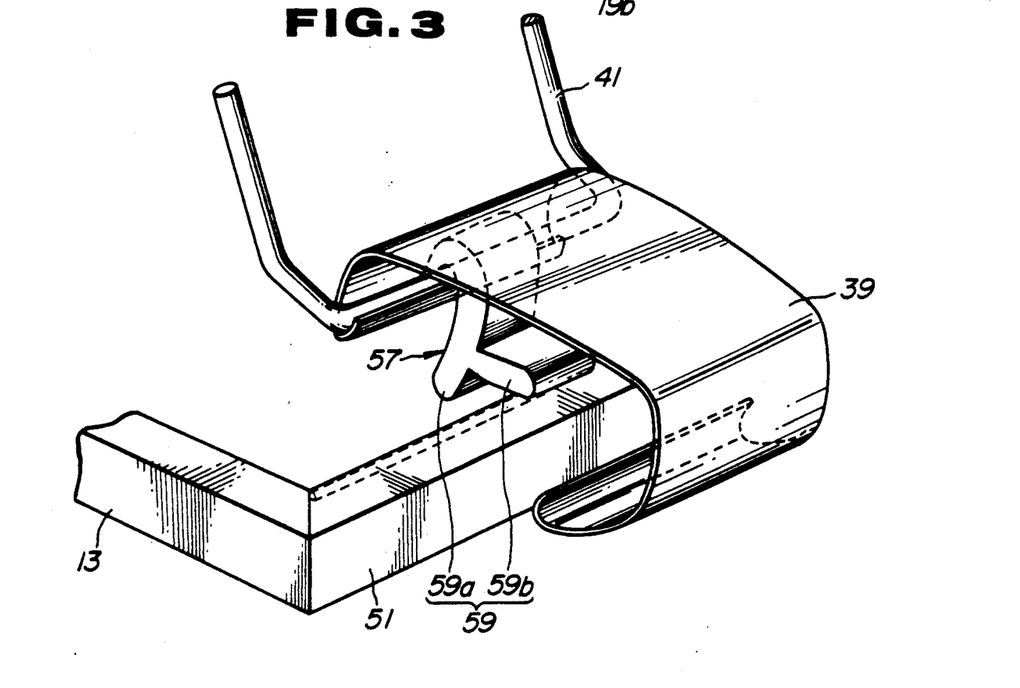
FIG. 3 is a partial, three quarter perspective view in which the essential elements of a seat back safety stopper, constructed in accordance with the instant invention, shown.
Figure 4:
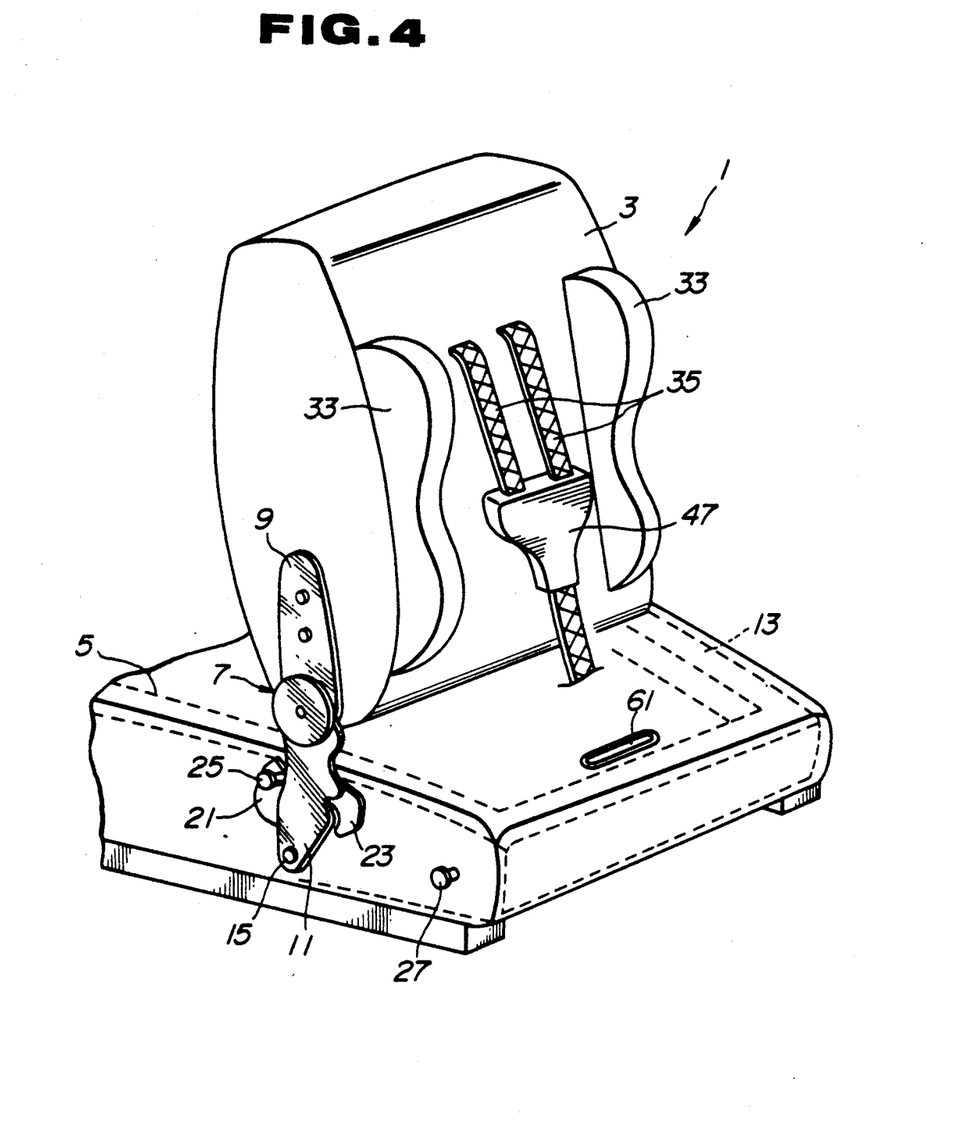
FIG. 4 is a rear three quarter perspective view of a vehicular seat on which an infant safety seat according to the instant invention is disposed, wherein the seat back is in the forward tilted position defining the infant mode and wherein the infant seat cushion has been removed.

As can be appreciated from FIGS. 2 and 3, a substantially rigid inner member 39 is provided for defining the support structure and general shape of the seat cushion member 37. A generally U-shaped stay 41 is welded to the front end of the inner support member 39 of the seat cushion member 37. As shown most clearly in FIG. 8 the stay 41, has arms which project upwardly at either side of a horizontal central section so as to engage holder 43 which is fixedly mounted on the bottom edge frame 10 of the seat back 3. The arms of the stay 41 are received in the holder in such a manner as to be freely detachably therefrom.

Thus the mechanism for detachably accommodating the infant safety seat on the seat back 3 of the vehicular seat 1 is defined by the stay 41 and the holder 43. Thus the infant seat cushion may be easily and quickly installed on or removed from the seat.

An infant safety harness assembly is provided for restraining the infant to the seat.

The infant safety harness assembly comprises shoulder straps 35 which are attached at one end thereof to an anchoring member 45 defined on the seat back frame 10 in the internal portion of the seat back 3. The infant safety harness mechanism's shoulder straps 35 are attached at their other ends to the top end of a breast cushioning member 47 which engages the chest of the infant seated in the infant seat defined at the rear of the seat back 3. The lower end of the breast cushioning member 47 is attached to an engaging tongue 49 by means of a crotch strap 49a which passed over the edge seat cushion member 37. The engaging tongue 49 is attached to the bottom end of the crotch strap 49a so as to be located at the bottom side of the infant safety seat cushion member 37 in the vicinity of the rearmost portion thereof. The engaging tongue 49 is provided so as to be detachably received in a safety buckle 55 which is attached at its lower end, via a lower strap member 55a, to the rear edge 51 of the internal frame 13 of the vehicular seat cushion 5 by means of a lower seat belt anchoring member 53 which projects downwardly at the lower side of the rear edge 51. Thus the infant safety harness comprises the infant shoulder straps 35, the breast cushioning member 47, the crotch strap 49a, the tongue 49, the safety buckle 55, and the lower strap 55a, which are connected in series so as to form a restraining mechanism for retaining the body of the infant of the infant seat defined by the back 3 of the vehicular seat, the infant restraining flanges 33 and the infant seat cushion member 37.

The infant seat cushion member 37 according to the invention further comprises a seat back stopper member 57 which is provided for the purpose of restricting the possible range of rotation of the seat back 3 about the axis defined by the internal pivot mechanism of the reclining device 7 for preventing rotation of the seat back 3 in the rearward direction (clockwise in FIGS. 1 and 2) beyond a defined limit.

The safety stopper mechanism of the infant safety seat according to the instant invention is essentially comprised of a Y-stopper member 59 which is generally an inverted Y shape in cross section and which has downwardly projecting arm sections 59a and 59b, and a Y-stopper arm receiving slot 61 which is formed at the rear upper edge of cross stay member 51 the seat cushion frame 13 and the seat cushion 5.

The Y-shaped seat back safety stopper functions, via the direct engagement of the downwardly projecting arms of the stopper mechanism with the lateral seat cushion frame member 51 of the inner frame 13 of the seat cushion 5. This engagement serves to arrest the rearward rotation on the seat back 3 while the infant safety seat cushion 37 is installed at the rear portion of the seat cushion 5 and the seat back 3 so as to prevent injury to the infant in the event of a rear end accident.

Specifically, the above functions are achieved by the Y-shaped safety stopper member 59 according to the instant invention via the engagement between the arm 59a and the front edge of the lateral frame member 51 of the internal frame 13 of the seat cushion 5, which engagement is enabled by the seat back safety stopper member slot 61 formed at the upper side of the seat cushion 5, and the engagement of the seat back safety stopper arm 59b with the upper surface of the rear edge of the seat cushion 5. This engagement serves to restrict the range of rotation of the seat back 3 about the axis defined by the seat back reclining mechanism 7 when force in the rearward direction on the seat back 3 exceeds that degree of force which the seat back reclining mechanism 7 can resist.

Thus, by employing a stopper mechanism, having the above described construction, at the rear edge of a seat cushion, it becomes possible to provide an infant safety seat at the rear side of an automobile seat having a conventional unreinforced pivoting and reclining mechanism without the danger of the seat back falling from the forwardly tilted infant mode position into the rearwardly tilting adult mode position while the infant safety seat is in use.

Hereinafter, operation of the infant safety seat mechanism according to the invention shall be described. When the seat back 3 is in the rearwardly tilted position defining the adult mode, the seat back 3 is tilted forwardly to the position defining the infant mode by means of the pivoting mechanism 17. In this case the latch release lever (not shown) generally provided at the side of the seat back 3 is operated so as to release the latch hook 23 from the pin 27 so as to allow the seat back to pivot forward about the journal pin 15. Thereafter, when the pivot mechanism 17 reaches the forward position the front latch hook 21 becomes engaged with the front latch pin 25 so as to lock the pivot mechanism 17, which carries the seat back 3, in the forwardly tilted position defining the infant mode.

In the above manner the seat back 3 becomes fixed in forwardly tilted position defining the infant mode. Thereafter the arms of the stay 41 which project upwardly at the front edge of the inner support member 39 of the infant seat cushion member 37 as can best be seen from FIG. 3, are inserted into the stay holder 43 provided at the lower rear edge of the seat back 3.

When the arms of the stay 41 projecting at the front edge of the seat cushion member 37 of the infant safety seat have been inserted into the holder 43 at the rear of the seat back 3, the infant may then be placed in the seat.

Once the infant is seated in the safety seat, thereafter the infant safety harness is attached so as to restrain the body of the infant within the seat.

It will be noted that in addition to holding the infant in place on the infant seat the infant safety harness also serves to hold the infant seat cushion member 37 on the rear side of the seat 1.

By means of the infant seat's safety harness assembly the infant seated in the infant safety seat is restricted from coming out of the infant safety seat as for example would otherwise occur in the event of a rear end accident wherein the vehicle in which the infant safety seat is provided would be struck from the rear by another automobile. In the case of such a rear end accident the force of the vehicle striking the rear of the vehicle in which the infant safety seat according to the invention in disposed causes the vehicle to jump forward and the inertia of the child in the safety seat effectively carries the infant's body backwards relative to the body of the automobile.

This backwards force of the infant's body is exerted mainly on the infants breast cushioning member 47, which is linked at its upper end to the shoulder harness 35. The force of the infant's body is exerted on the breast cushioning member is therefore exerted in the direction indicated by arrow (a) in FIG. 5. The force on the breast cushioning member 47 is therefore transmitted through the shoulder harness 35 to the seat back 3 as a tensile force in the direction indicated by the arrow denoted (b) in FIG. 5.

This tensile force is also exerted on the anchor member 53 as well as the anchor member 45 which is formed in connection with the frame 10 of the seat back 3. The force of the infant's body in the rearward direction which is exerted on the seat back 3 through the child's safety harness 35 urges the seat back in the rearward direction as indicated by the arrow (d) shown in FIG. 5.

Figure 5:
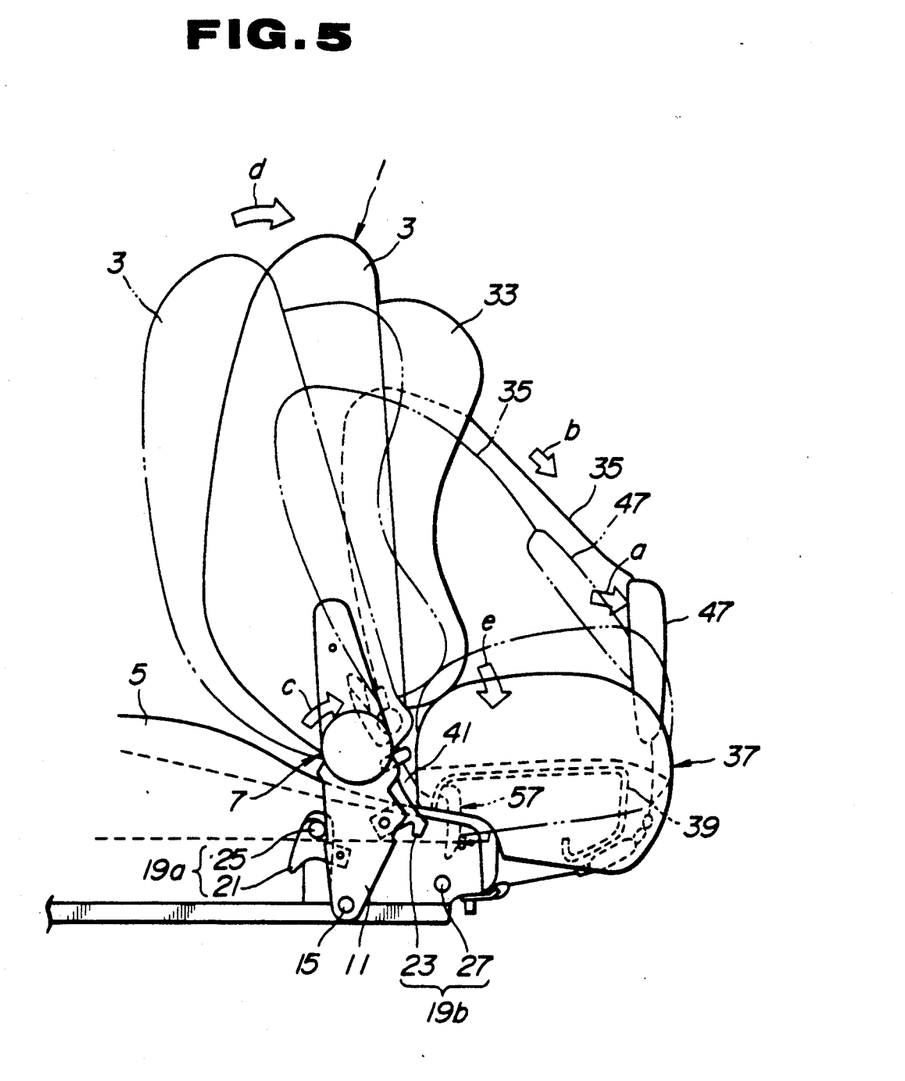
FIG. 5 is a side elevational view of a vehicular seat on the back side of which an infant safety seat according to the invention has been disposed, wherein the phantom chain lines indicate the seat back and the infant safety seat in their normal positions, and the solid lines indicate the positions of the infant safety harness and the seat back, which would occur when forces in the directions indicated by the arrows were applied to the seat back and safety harness as in a rear end type vehicular accident.

This rearward force on the seat back 3 translates into an extremely strong clockwise rotational force which is exerted on the link plate 11 of the pivoting mechanism 17 through the reclining mechanism 7 as indicated by the arrow (c) in FIG. 5.

At this time, since the forward latching hook 21 is firmly engaged with the forward latch stopper pin 25, the lower link plate 11 is, in effect, rigidly maintained in the forward position. Therefore, since the pivoting link 11 cannot be rotated in the direction shown by the arrow (c) by the force exerted on the seat back 3 by the infant's body, the rotational force exerted on the seat back 3 in the rearward direction is effectively concentrated on the reclining mechanism 7 of the seat back 3.

In the situation set forth above the engagement between the teeth of the annular gear (not shown) and the dog (not shown) of the reclining mechanism 7 is overcome by the rotational force exerted thereon by the seat 3, thus the seat back 3 is caused to rotate in the direction indicated by the arrow (d) in FIG. 5 so as to move toward the position defining the adult mode.

This rotation of the seat back 3 in the rearward direction exerts a rotational force on the seat cushion member 37 of the infant seat which causes it to rotate downwardly in the direction indicated by the arrow (e) in FIG. 5 about a pivoting axis defined by the reclining mechanism 7. This downward rotation of the infant seat cushion member 37 has the effect of urging the front arm of the inverted Y-shaped stopper member 59 into the stopper receiving slot 61 defined in the upper rear edge of the seat cushion member 5 so that the inner surface of the arm 59a engages the front inner edge of the lateral frame member 51 of the seat cushion frame 13.

The rear arm of the inverted Y-shaped stopper member on the other hand is driven into forceful engagement with the upper surface of the lateral frame member 51 of the seat cushion frame 13 thus preventing the further insertion of the inverted Y-shaped member into the receiving slot 61 beyond the stopping engaging position indicated by the solid lines in FIG. 5.

Figure 6:
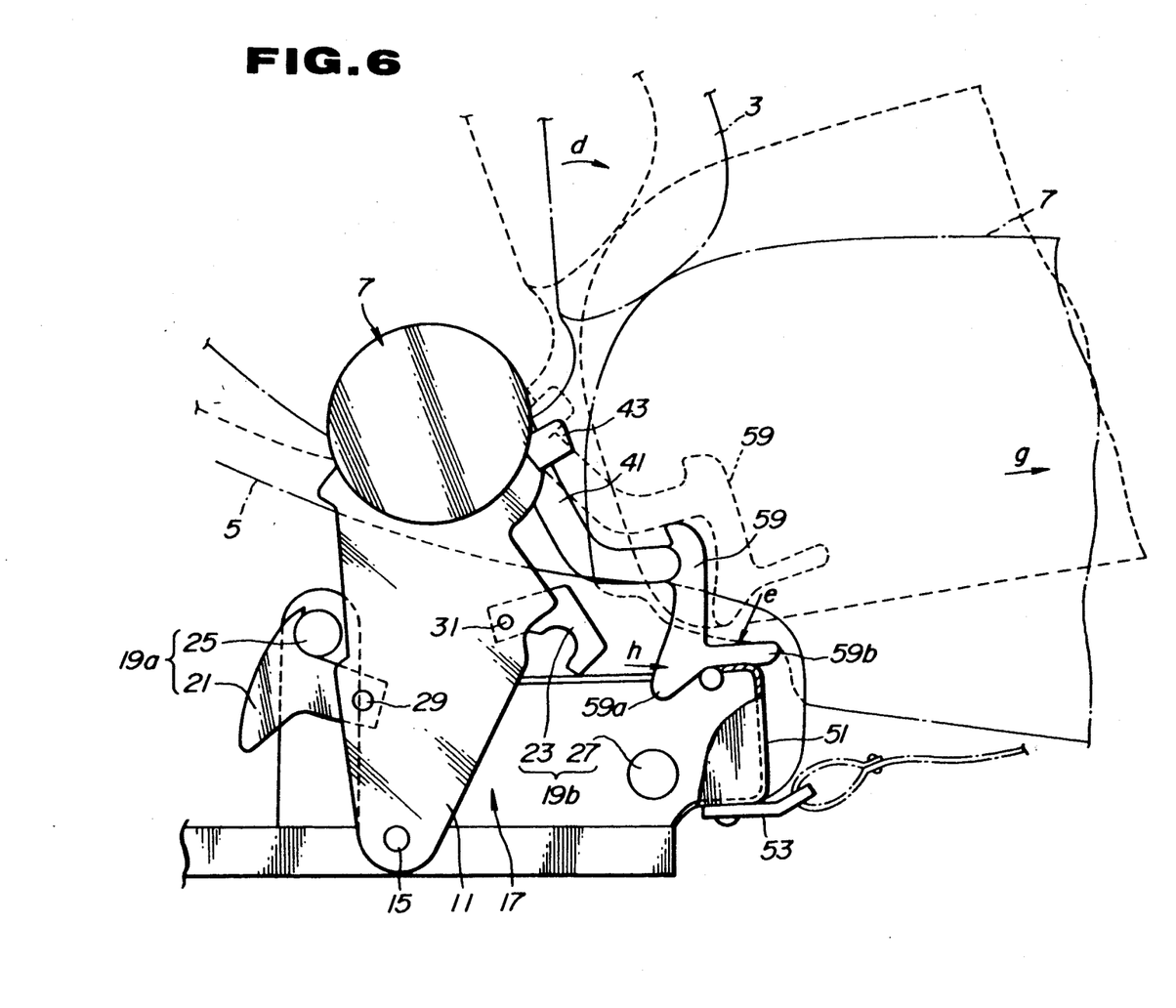
FIG. 6 is an enlarged partial side elevation view showing the hinge mechanism of a vehicular seat back on which an infant safety seat according to the instant invention has been disposed wherein the normal positions of the seat back and the infant seat cushion are indicated in dotted lines and wherein the broken chain lines indicate the infant seat cushion and the seat back in the positions which they would assume if subjected to the forces occurring in a rear end type vehicular accident.

In FIG. 6 the view of the stopper member is enlarged and the seat stopper 59 is indicated by the solid lines in the state wherein it has been forced into engagement with the lateral frame member 51.

In this manner the stopper member becomes engaged with the lateral frame member 51 of the inner frame 13 of the seat cushion member for preventing the further rearward rotation of the seat back member 3. Thus it becomes impossible for the seat back to fall rearwardly while the infant safety seat is disposed on the rear side of the seat back 3.

Figure 7:
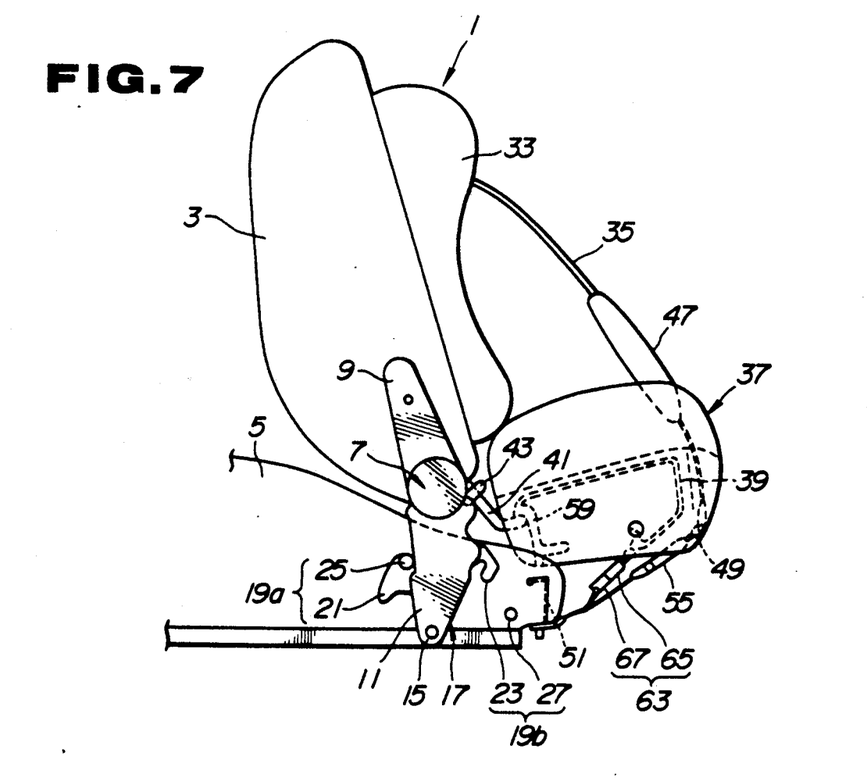
FIG. 7 is a side elevation view of a vehicular seat on which an infant safety seat constructed according to the principles of a second embodiment of the instant invention is disposed.

In FIG. 7 a second embodiment of an infant safety seat according to the instant invention is explanatorily depicted. The parts of the second embodiment whose functions are essentially identical to those of the first embodiment will not be described in detail so as to avoid redundant disclosure.

The construction of the second embodiment of the instant invention differs from that of the first embodiment of the invention in that an additional connector link member 63 comprised of members 67 and 65 is provided at lower side of the infant seat cushion member 37. The connector link member 63 forms a link between the infant seat cushion member 37 and the anchor member 51 formed at the bottom of the seat cushion frame 13 of the seat cushion 5. At one end of the connector link 63 the tongue member 65 is connected to the inner frame member 39 of the infant seat cushion member 39 and at the other end of the connector link member 63 the buckle member 67 is connected to the anchor member defined on the bottom of the lateral frame member 51 of the seat cushion 5. Thus the internal frame member 39 of the infant seat cushion 37 is fixed directly to the lateral frame member 51 of the internal frame member 13 of the seat cushion 5 by means of the engagement of the tongue 65 with the buckle 67.

The provision of the positive connection between the internal frame 39 of the infant seat cushion member 37 serves to provide an additional safety feature to those provided by the construction according to the first embodiment in that it prevents the rotation of the seat back 3 in the forward direction.

The explanation of the manner in which the infant seat cushion according to the second embodiment of the invention restricts the forward rotation of the seat back 3 is set out hereinafter.

When force acting on the seat back 3 in the forward direction becomes great enough to overcome the reclining mechanism, the seat back tilts forward slightly, rotating about the axis of the reclining mechanism in the counterclockwise direction of FIG. 7. This counter clockwise rotation of the seat back causes the infant seat cushion 37, which is rigidly attached to the bottom of the seat back 3 by means of the engagement of the stay 41 with the holder 43, to also rotate in the counterclockwise direction of FIG. 7.

Since the rear edge of the infant seat cushion 37 is attached to the lateral member 51 of the inner frame 13 of the seat cushion 5 by means of the connector belt member 63, once the connector belt member 63 becomes taunt it becomes impossible for the infant seat cushion to rotate about the axis of the reclining mechanism. Therefore, since the infant seat cushion is rigidly retained on the bottom of the seat back 3 by means of the holder 43, it also becomes impossible for the seat back 3 to rotate further in the counterclockwise direction.

As set forth above, by providing a vehicular infant safety seat constructed in accordance with the principles of the instant invention, it is possible to provide an infant safety seat. Thus a superior infant safety seat is provided at a greatly reduced manufacturing cost because a special reinforced reclining mechanism does not need to be provided in the automobile in which the infant safety seat is to be employed thus allowing use of a single standard production line of reclining device.

It will be appreciated by those skilled in the art that although the safety stopper set forth in the above embodiments is provided on an infant seat cushion which is attached to the lower edge of the seat back's interior frame, embodiments are also conceivable wherein the infant seat cushion comprising the stopper is rigidly attached to the rear end portion of the main seat cushion. In such an embodiment the stopper would be rigidly affixed to the main seat cushion frame along with the infant seat cushion. Thus the safety stopper would have an upper portion which would come into engagement with the lower portion of the seat back frame in the event that the seat back reclining mechanism's dog clutch was overcome by rearward rotational forces imposed on the seat back.

It will also be appreciated by those skilled in the art that embodiments of the seat stopper are conceivable wherein the infant seat cushion is rigidly attached to neither the seat back frame or the main seat cushion frame but "floats" therebetween maintained in position by the infant safety strap or other restraining means. In such an embodiment the seat back safety stopper would only come into contact with the frames of the seat back and seat cushion when the dog clutch of the seat back was overcome by rearward rotational forces acting on the seat back.

It will be appreciated that the embodiment set forth above in the detailed disclosure represents but one of a large number of possible modes by which a safety stopper device might be carried out and that it is not intended to imply limitation to the scope of the invention beyond that set forth in the appended claims.

What is claimed is:

1. A vehicular seat, comprising:
   a seat cushion, said seat cushion including a seat cushion frame having a portion which extends across the rear of said seat cushion proximate a rear edge thereof;
   a seat back support mechanism, said seat back support mechanism being mounted on said seat cushion frame;
   a seat back, said seat back being movably supported by said seat back support mechanism so as to be movable between a first position wherein the seat can be occupied and a second position wherein the seat back is angled forward over the seat cushion; and
   an infant seat comprising:
   an infant back support, said infant back support being disposed on a back side of said seat back;
   a seat back frame included in said seat back;
   an infant seat cushion structure;
   means for detachably connecting said infant seat cushion structure to said seat back frame;
   said infant seat cushion structure being supported on the seat back in a manner wherein a rear edge thereof which juxtaposes the seat back is engageable with an upper rear portion of said seat cushion and wherein a main portion of said infant seat cushion projects out beyond the rear portion of said seat cushion;
   restraining means for restraining an infant within said infant seat, said restraining means including a seat belt, an upper end of which is connected to said seat back and a lower end of which is connected to the seat cushion frame; and
   a stopper, said stopper being rigidly connected to a rear edge of said infant seat cushion, said stopper being arranged to abut against the rear portion of said seat cushion frame which extends proximate the rear of said seat cushion and to stop movement of seat back from said second position toward said first position.

2. The seat of claim 1, further comprising:

an anchor formed at a bottom of said seat cushion frame and a connector link connecting said anchor to a lower side of said infant seat cushion structure.

3. The seat of claim 2, wherein said connector link comprises a tongue member which is connected to said lower side of said infant seat cushion structure and a buckle member which engages said tongue member and which is connected to said anchor.

4. An infant seat arrangement for a vehicular seat comprising:
reclining means for selectively adjusting the reclining angle of a seat back with respect to a main seat cushion;
an infant seat cushion;
means for detachably connecting said infant seat cushion to a back side of said seat back, said infant seat cushion being arranged with respect to said main seat cushion so that contact between the lower side of said infant seat cushion and the upper side of said main seat cushion is limited to contact between a lower rear edge portion of said infant seat cushion and an upper rear portion of said main seat cushion; and
a seat back stopper, said seat back stopper being rigidly connected to said infant seat cushion and abutting against a rigid frame portion of the main seat cushion and blocking movement of said seat back relative to said first seat cushion while said infant seat cushion is connected to the seat back.

5. The seat arrangement of claim 2, further comprising:
an anchor formed at a bottom of said main seat cushion and a connector link connecting said anchor to a lower side of said infant seat cushion.

6. The seat arrangement of claim 5, wherein said connector link comprises a tongue member which is connected to said lower side of said infant seat cushion and a buckle member which is adapted to engages said tongue member and which is connected to said anchor.

7. A vehicular seat comprising:
a seat back,
a main seat cushion,
a base link which operatively interconnects the seat back and the main seat cushion and which permits said seat back to be moved forward from a normal seating position to a forwardly tilted position in which the seat back is acutely angled with respect to the main seat cushion,
a seat back base link locking mechanism associated with said base link and said main seat cushion for locking said seat back base link in the forwardly tilted position,
a seat back reclining mechanism disposed at one end of said base link and which defines an axis about which said seat back may be pivoted relative to said seat back base link, said seat back reclining mechanism permitting said seat back to assume a plurality of different angular positions which respect to said seat back base link and selectively locking said seat back in a selected one of said plurality of angular positions;
an infant seat cushion mounting member connected to a rigid frame member of said seat back;
an infant seat cushion;
an infant seat cushion stay extending from said infant stay cushion, said infant seat cushion stay being detachably connected to said seat cushion mounting member;
a main seat cushion frame member, said main seat cushion frame member having a portion proximate a rear portion of said main seat cushion; and
a seat back stopper, said seat back stopper being rigidly formed on said infant seat cushion stay and arranged to project toward said portion of said main seat cushion frame member, said seat back back stopper contacting said portion of said main seat cushion frame member and arresting rearward movement of said seat back.

8. The seat of claim 7, further comprising:
an anchor formed at a bottom of said main seat cushion and a connector link connecting said anchor to a lower side of said infant seat cushion.

9. The seat arrangement of claim 8, wherein said connector link comprises a tongue member which is connected to said lower side of said infant seat cushion and a buckle member which engages said tongue member and which is connected to said anchor.

10. A vehicular seat comprising:
a seat back having a frame;
a main seat cushion having a seat cushion frame, said seat cushion frame having a member which is disposed at a rear portion of said seat cushion;
a link which operatively interconnects the seat back and the main seat cushion and which permits said seat back to be moved forward from a normal seating position to a forwardly tilted position wherein the seat back is acutely angled with respect to the main seat cushion;
a locking mechanism disposed on one of said link and said seat cushion for locking said link in a forward position with respect to said main seat cushion and for preventing the seat back from moving rearwardly;
a seat back reclining mechanism disposed at one end of said link, said seat back reclining mechanism permitting said seat back to be selectively pivoted with respect to said link and selectively locked in a selected position with respect to said link;
an infant seat cushion mounting member rigidly connected to the frame of said seat back;
an infant seat cushion, said infant seat cushion having a lower rear edge portion thereof which contacts an upper rear edge portion of said seat cushion;
an infant seat cushion stay extending from said infant seat cushion, said infant seat cushion stay being detachably connected to the infant seat cushion mounting member; and
a stopper, said stopper being rigidly formed on said infant seat cushion stay, said stopper engaging a portion of said seat cushion frame member which is proximate a rear of the seat cushion and preventing rearward movement of said seat back.

11. The seat of claim 10, further comprising:
an anchor formed at a bottom of said main seat cushion and a connector link connecting said anchor to a lower side of said infant seat cushion.

12. The seat arrangement of claim 11, wherein said connector link comprises a tongue member which is connected to said lower side of said infant seat cushion and a buckle member which engages said tongue member and which is connected to said anchor.

13. A vehicle seat comprising:
a seat cushion, said seat cushion having a frame;
a seat back, seat back having a seat back frame;
an infant seat disposed on a rear of the seat back, said infant seat having a cushion portion which projects out beyond a rearmost level of said seat cushion in a manner wherein the contact area between cushion portion and the seat cushion is small;

means for interconnecting said seat cushion and said seat back so that the seat back can be selectively moved in a forward direction from a position wherein an occupant can occupy the seat cushion to a position wherein the seat back extends over the top of said seat in an acutely angled relationship therewith, and wherein an infant can be seated in said infant seat;

a stay which forms part of said infant seat;

means for detachably connecting the stay to the seat back frame; and a stopper which is rigidly attached to said stay and which abuts a portion of the frame of said seat cushion to prevent rearward movement of said seat back.

14. The seat of claim 13, further comprising:

an anchor formed at a bottom of said main seat cushion and a connector link connecting said anchor to a lower side of said infant seat.

15. The seat arrangement of claim 14, wherein said connector link comprises a tongue member which is connected to said lower side of said infant seat and a buckle member which engages said tongue member and which is connected to said anchor.

* * * * *